US012657750B2

(12) United States Patent
Wu et al.

(10) Patent No.: US 12,657,750 B2
(45) Date of Patent: Jun. 16, 2026

(54) SLOPE LOCATION CORRECTION METHOD AND APPARATUS, ROBOT AND READABLE STORAGE MEDIUM

(71) Applicant: SHENZHEN PUDU TECHNOLOGY CO., LTD., Nanshan District Shenzhen (CN)

(72) Inventors: Jinlong Wu, Shenzhen (CN); Tao Zhang, Shenzhen (CN); Kejun He, Shenzhen (CN); Meiwen Chen, Shenzhen (CN)

(73) Assignee: SHENZHEN PUDU TECHNOLOGY CO., LTD., Shenzhen (CN)

( * ) Notice: Subject to any disclaimer, the term of this patent is extended or adjusted under 35 U.S.C. 154(b) by 313 days.

(21) Appl. No.: 18/262,455

(22) PCT Filed: Jan. 21, 2022

(86) PCT No.: PCT/CN2022/073163
§ 371 (c)(1),
(2) Date: Jul. 21, 2023

(87) PCT Pub. No.: WO2022/161271
PCT Pub. Date: Aug. 4, 2022

(65) Prior Publication Data
US 2024/0077880 A1     Mar. 7, 2024

(30) Foreign Application Priority Data
Jan. 26, 2021    (CN) .......................... 202110104694.3

(51) Int. Cl.
G05D 1/00 (2024.01)

(52) U.S. Cl.
CPC .................................... G05D 1/027 (2013.01)

(58) Field of Classification Search
CPC ...................................................... G05D 1/027
See application file for complete search history.

(56) References Cited

U.S. PATENT DOCUMENTS

| | | | |
|---|---|---|---|
| 7,826,926 B2 * | 11/2010 | Myeong ................. | G05D 1/027 |
| | | | 318/568.12 |
| 9,561,592 B1 | 2/2017 | Da Silva et al. | |
| 10,856,796 B1 * | 12/2020 | Berme .................... | G06F 3/013 |

FOREIGN PATENT DOCUMENTS

| | | |
|---|---|---|
| CN | 103412487 A | 11/2013 |
| CN | 106406338 A | 2/2017 |

(Continued)

OTHER PUBLICATIONS

Chinese Office Action (w/ English translation) for corresponding Application No. 202110104694.3, dated Nov. 21, 2023, 14 pages.

(Continued)

*Primary Examiner* — Erin D Bishop
*Assistant Examiner* — Shivam Sharma
(74) *Attorney, Agent, or Firm* — OPENPTO US LLC; Yuhao Liang

(57) ABSTRACT

A slope location correction method, comprising the following steps: measuring location data, in a predetermined area, of a robot by using an inertial measurement element of the robot, and calculating a pose of the robot in the predetermined area according to the location data; determining whether there is a slope in the predetermined area by means of the pose of the robot; and if it is determined that there is a slope in the predetermined area, compensating for a location error at the slope by using the pose corresponding to the slope. The present application further relates to a slope location correction apparatus, a robot and a readable storage medium.

13 Claims, 2 Drawing Sheets

(56)             References Cited

FOREIGN PATENT DOCUMENTS

| CN | 106959110 A | 7/2017 | | |
| CN | 109001787 A | 12/2018 | | |
| CN | 109634302 A | 4/2019 | | |
| CN | 109676604 A | 4/2019 | | |
| CN | 110450159 A | 11/2019 | | |
| CN | 110842921 A | 2/2020 | | |
| CN | 210757742 U | 6/2020 | | |
| CN | 111730605 A | 10/2020 | | |
| CN | 211786766 U | 10/2020 | | |
| CN | 111891252 A | 11/2020 | | |
| CN | 111891252 B | * 11/2021 | ........... | B62D 57/032 |
| KR | 100864607 B1 | 10/2008 | | |
| KR | 1020110022953 A | 3/2011 | | |
| KR | 20160128126 A | 11/2016 | | |

OTHER PUBLICATIONS

Extended European Search Report for corresponding Application No. 22745146.5, dated Jun. 5, 2024, 10 pages.
Jixin L V et al., "Indoor Slope and Edge Detection by using Two-Dimensional EKF-SLAM with Orthogonal Assumption", International Journal of Advanced Robotic Systems, Japan, 2015, 16 pages.
International Search Report and Written Opinion (with English translation) for Application No. PCT/CN2022/073163, dated Mar. 23, 2022, 11 pages.

\* cited by examiner

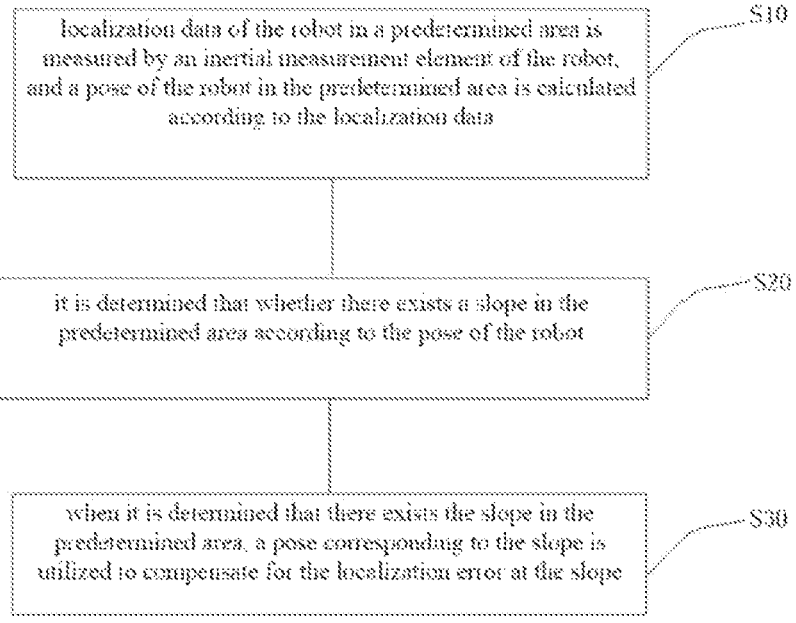

localization data of the robot in a predetermined area is
measured by an inertial measurement element of the robot,
and a pose of the robot in the predetermined area is calculated
according to the localization data
— S10 it is determined that whether there exists a slope in the
predetermined area according to the pose of the robot
— S20 when it is determined that there exists the slope in the
predetermined area, a pose corresponding to the slope is
utilized to compensate for the localization error at the slope
— S30

FIG. 1 pose calculation unit
100 slope determination unit
200 localization error
compensation unit 300

FIG. 2

SLOPE LOCATION CORRECTION METHOD AND APPARATUS, ROBOT AND READABLE STORAGE MEDIUM

CROSS REFERENCE TO RELATED APPLICATION

The present application is a U.S. national stage application of PCT international application PCT/CN2022/073163, filed on Jan. 21, 2022, which claims priority to the Chinese Patent Application No. 202110104694.3, filed on Jan. 26, 2021 and titled "Slope Location Correction Method and Apparatus, Robot and Readable Storage Medium", the content of which is expressly incorporated herein by reference in its entirety.

TECHNICAL FIELD

The present disclosure relates to the field of robot localization, and particularly to a slope localization correction method and apparatus, a robot and a readable storage medium.

BACKGROUND

With the rapid development of robot-related technologies, people's demand for robots is also increasing. Wheeled mobile robots rely on rollers to move to automatically perform work, which can be directed by human, or can perform preset programs, or operate according to principles formulated based on artificial intelligence techniques. The mission of the robot is to assist or replace the human work, such as meal delivery, sending and receiving express, etc.

The operation of the wheeled mobile robots depends on the precise localization of a work place on the map. The indoor localization technology based on the combination of vision and a wheeled mileage encoder is more and more widely used in the robotics. In such localization method, the camera is first utilized to extract the image features; a pose change of the robot is calculated after the feature matching is performed; then the wheeled odometer is utilized to perform the integration on the encoder to get the pose change of the robot; and finally the results of the above pose changes are combined to obtain the final pose of the robot. However, due to the limitations of the camera and the wheeled mileage encoder, the localization error caused by a localization jump resulted from, such as up and down the slope and severe bumps, in the large-scale indoor complex scenes cannot be solved. Such localization error inevitably affects the obstacle avoidance, planning and decision-making of the robots in the indoor scenarios requiring a high localization accuracy.

The existing technology cannot avoid the localization jump caused by the indoor slope environment, which results in the localization error. At present, there are generally two solutions. The first solution is to set up a slope element when the map is built, and the localization is directly compensated for when the robot is positioned to the slope position; but since the robot may also rotate and move in multiple directions on the slope, such inflexible compensation manner may cause inaccurate localization of the robot. The second solution is to set an obstacle (virtual wall) at the slope when the map is built, such that the robot may not go over the slope when localization and planning, thereby avoiding the localization errors caused by up and down the slope, but this manner limits the operating boundaries of the robot.

The above two solutions in the existing technology both avoid or reduce the localization error caused by the slope, but both have more or less limitations and deficiencies, and cannot avoid the localization error caused by the violent bumping or shaking of the body.

The current localization solution of the meal delivery service robot mainly uses the combination of Marker (an identifier for guiding the operation of the robot) and the odometer. Since the localization solution involving the Mark cannot determine whether the pose change of the robot during the movement is caused by the movement on the horizontal road surface or caused by the change in the angle of view resulted from up and down the slope, if the localization jump caused by up and down the slope cannot be avoided by using an appropriate localization correction solution, the final localization result may have a deviation; and the deviation in the localization may lead to a series of problems in the perception, planning and decision-making functions of the robot, etc. Therefore, a compensation solution with high robustness, fast real-time performance and high precision is required to compensate for and correct the localization error caused by the slope environment.

SUMMARY

According to the embodiments of the present disclosure, a slope localization correction method is provided, which is applied to a robot, and includes:

measuring localization data of the robot in a predetermined area by an inertial measurement element of the robot, and calculating a pose of the robot in the predetermined area according to the localization data;

determining whether there exists a slope in the predetermined area according to the pose of the robot;

compensating for a localization error at the slope by using a pose corresponding to the slope when determining that there exists the slope in the predetermined area.

A slope localization correction apparatus is provided, which is applied to a robot and includes:

a pose calculation unit, configured to measure localization data of the robot in a predetermined area by an inertial measurement element of the robot, and calculate a pose of the robot in the predetermined area according to the localization data;

a slope determination unit, configured to determine whether there exists a slope in the predetermined area according to the pose of the robot; and a localization error compensation unit, configured to, when there exists the slope in the predetermined area, use a pose corresponding to the slope to compensate for the localization error at the slope.

A robot is provided, including a processor and a memory for storing a computer program executable by the processor, the processor, when executing the computer program, performs steps of:

measuring localization data of the robot in a predetermined area by an inertial measurement element of the robot, and calculating a pose of the robot in the predetermined area according to the localization data;

determining whether there exists a slope in the predetermined area according to the pose of the robot;

when determining that there exists the slope in the predetermined area, compensating for a localization error at the slope by using a pose corresponding to the slope.

One or more computer-readable storage media for storing computer-readable instructions are provided, the computer-readable instructions, when executed by one or more processors, cause the one or more processors to perform steps of:

> measuring localization data of the robot in a predetermined area by an inertial measurement element of the robot, and calculating a pose of the robot in the predetermined area according to the localization data;
>
> determining whether there exists a slope in the predetermined area according to the pose of the robot;
>
> compensating for a localization error at the slope by using a pose corresponding to the slope when determining that there exists the slope in the predetermined area.

Details of one or more embodiments of the present disclosure are set forth in the accompanying drawings and description below. Other features and advantages of the present disclosure will become obvious from the specification, drawings and claims.

BRIEF DESCRIPTION OF THE DRAWINGS

In order to illustrate the technical solution of the embodiments of the present disclosure more clearly, the accompanying drawings used in the description of the embodiments of the present disclosure will be briefly introduced below. Obviously, the accompanying drawings in the following description are only some embodiments of the present disclosure, those skilled in the art can also obtain other drawings according to these drawings without any creative effort.

FIG. 1 is a flow chart showing a slope localization correction method according to an embodiment of the present disclosure;

FIG. 2 is a structural block diagram of a slope localization correction apparatus according to an embodiment of the present disclosure;

DETAILED DESCRIPTION

Figure 3:
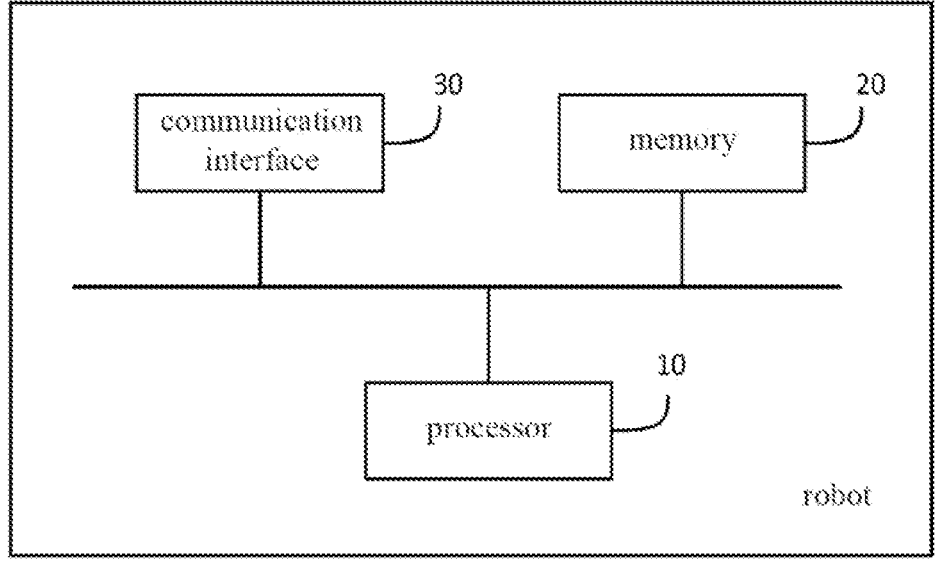
FIG. 3 is a schematic module diagram of a robot according to an embodiment of the present disclosure.

The embodiments of the present disclosure are described in detail below, examples of which are shown in the drawings, and the same or similar reference signs denote the same or similar elements or elements having the same or similar functions throughout. The embodiments described below with referring to the drawings are exemplary and are intended to explain the present disclosure, rather than being construed as limiting the present disclosure.

The present disclosure provides a slope localization correction method. Compared to the conventional methods of artificially measuring a slope angle or artificially setting a virtual wall, the method has good real-time performance, high robustness, high correction accuracy, and is convenient and quick.

FIG. 1 is a flow chart of a slope localization correction method according to an embodiment of the present disclosure. Referring to FIG. 1, the present disclosure provides a slope localization correction method, which is applied to a robot to compensate for and correct a localization error caused by the slope environment during the operation of the robot. In the embodiment, a wheeled meal delivery robot operating indoors is taken as an example of the robot. In other embodiments, the robot may also be other robots, such as an industrial robot engaged in production, etc.

The slope localization correction method includes the following steps.

S10: localization data of the robot in a predetermined area is measured by an inertial measurement element of the robot, and a pose of the robot in the predetermined area is calculated according to the localization data.

Specifically, as for the meal deliver robot in the present disclosure, an inertial measurement element is integrated inside the meal delivery robot, and the inertial measurement element at least includes an angular motion detection device configured to measure an angular velocity and an acceleration detection device configured to measure a linear acceleration. In the embodiment, the angular motion detection device is a gyroscope as an example; and the acceleration detection device is an accelerometer as an example. In other embodiments, the angular motion detection device and the acceleration detection device may also be other measuring instruments which can measure the angular velocity and the linear acceleration of the robot respectively. Both the gyroscope and the accelerometer in this embodiment are integrated in the inertial measurement element; the gyroscope is configured to measure an angular velocity and an angular acceleration value at each position during the operation of the robot; and the accelerometer is configured to measure the linear acceleration value at each position during the operation of the robot.

The meal delivery robot in the present disclosure operates in a restaurant, and the operation thereof in the restaurant depends on a route planning map in the restaurant. Before the meal delivery robot works for the first time, or when the layout of the restaurant changes, the map needs to be re-planned. Preferably, the meal delivery robot in the present disclosure is provided with a Simultaneous Localization and Mapping (SLAM) system. The SLAM allows the robot to gradually draw a map of the environment while moving in the restaurant. During the movement, the robot can localise itself according to the position estimation and the map. Meanwhile, an incremental map is built based on the own localization of the robot, so that the robot can travel to every position in the restaurant that can be entered without an obstacle, to implement the autonomous localization and navigation of the meal delivery robot.

During the operation of the robot in the present disclosure, the localization data of the robot at each position can be measured through the inertial measurement element thereof. Specifically, the inertial measurement element in the present disclosure includes three uniaxial accelerometers and three uniaxial gyroscopes. The accelerometer is configured to detect an independent triaxial acceleration signal of the robot in a body coordinate system; the gyroscope is configured to detect an angular velocity signal of the robot with respect to a navigation coordinate system, which measures the angular velocity and angular acceleration of the robot in a three-dimensional space.

In the method of the present disclosure, after the linear acceleration value, the angular velocity value, the angular acceleration value, and other localization data of the robot at each position by using the inertial measurement element, these localization data is utilized to calculate a pose of the robot at a corresponding position. Generally, the pose of the robot includes a position thereof in the restaurant and a pose of the robot at the position in the restaurant. The pose of the robot includes data such as a pitch angle, a roll angle, and a yaw angle, etc.

S20: it is determined that whether there exists a slope in the predetermined area according to the pose of the robot.

Specifically, as for the meal delivery robot in the present disclosure, after the localization data at each position is measured through the inertial measurement element, and the pose of the robot at the position is determined according to the localization data, it can be determined that whether there exists a slope at the position according to the pose of the robot at the position. When there exists a slope at a certain position in the restaurant, the pitch angle in the localization data measured by the meal delivery robot may change when the robot travels to this position, and the roll angle may also usually change. Accordingly, with the method of the present disclosure, it can be determined that there exists the slope at the position when determining that the pitch angle in the pose data changes, or both the pitch angle and the roll angle change.

S30: when it is determined that there exists the slope in the predetermined area, a pose corresponding to the slope is utilized to compensate for the localization error at the slope.

Specifically, when it is determined that there exists a slope at a certain position in the restaurant when the meal delivery robot travels to this position, the pose of the robot at the slope is utilized to compensate for the localization error at the slope, that is, an Euler angle at the slope measured by the robot is utilized to compensate for the jump in the angle of view caused by the environmental changes, thereby avoiding the defects that the robot thinks its own state changes due to the jump in the angle of view caused by up and down the slope or violent bumps, and then affects the localization result, resulting in the localization jump.

In the slope localization correction method of the present disclosure, the inertial measurement element is utilized to obtain the pose and pose changes of the robot in real time, and then the change in the environment where the robot is located is inferred, thereby compensating for the robot localization results in real time, with good real-time performance. Moreover, the robot can calculate the environment and environmental changes according to the changes in its own position and pose. Under the premise of no human interference, the robot itself corrects its own localization error, and it is no longer necessary to artificially set up the virtual wall or artificially measure the angle of the slope, which is convenient and quick.

In a specific embodiment, the specific steps of using the inertial measurement element of the robot to measure the localization data of the robot in the predetermined area, and calculating the pose of the robot in the predetermined area according to the localization data include:

the triaxial acceleration and triaxial angular velocity of the robot are measured by the inertial measurement element; the pose of the robot is calculated through a first Euler angle anti-rotation matrix formed by the triaxial acceleration and a second Euler angle anti-rotation matrix formed by the triaxial angular velocity.

Specifically, in the slope localization correction method for the robot in the present disclosure, the state of the meal delivery robot is first modeled, and state variables are set as follows:

$$
\begin{bmatrix} w_x \\ w_y \\ w_z \\ wa_x \\ wa_y \\ wa_z \\ ze_x \\ ze_y \\ ze_z \end{bmatrix} = \begin{bmatrix} gyro_x \\ gyro_y \\ gyro_z \\ gyro_{ax} \\ gyro_{ay} \\ gyro_{az} \\ accel_x \\ accel_y \\ accel_z \end{bmatrix}, \tag{1}
$$

where, w denotes the triaxial angular velocity; $w_x$ denotes an angular velocity in the X-axis in the three-dimensional coordinate system (including the X-axis, Y-axis and Z-axis); $w_y$ denotes an angular velocity in the Y-axis in the three-dimensional coordinate system; and $w_z$ denotes an angular velocity in the Z-axis in the three-dimensional coordinate system; $w_a$ denotes a three-dimensional angular acceleration, where $wa_x$ denotes an angular acceleration in the X-axis in the three-dimensional coordinate system; $wa_y$ denotes an angular acceleration in the Y-axis in the three-dimensional coordinate system; and $wa_z$ denotes an angular acceleration in the Z-axis in the three-dimensional coordinate system; ze denotes triaxial components of the angular acceleration in the body coordinate system, where $ze_x$ is a component of the angular acceleration in the X-axis in the body coordinate system; $ze_y$ is a component of the angular acceleration in the Y-axis in the body coordinate system; $ze_z$ is a component of the angular acceleration in the Z-axis in the body coordinate system.

In the method of the present disclosure, after the state variables are set for the above-mentioned meal delivery robot, the measurement matrix is set, and the expression of the measurement matrix Z is:

$$
Z = \begin{bmatrix} G \\ A \end{bmatrix}, \tag{2}
$$

where G denotes an output of the triaxial gyroscope; A denotes an output of the triaxial accelerometer;

$$
A = \begin{bmatrix} 0 & a_z & -a_y \\ -a_z & 0 & a_x \\ a_y & -a_x & 0 \end{bmatrix}, \tag{3}
$$

$$
G = \begin{bmatrix} 0 & -w_z & w_y \\ w_z & 0 & -w_x \\ -w_y & w_x & 0 \end{bmatrix}, \tag{4}
$$

where A represents the first Euler angle anti-rotation matrix formed by the acceleration, G represents the second Euler angle anti-rotation matrix formed by the angular velocity; the first Euler angle anti-rotation matrix and the second Euler angle anti-rotation matrix both consist of three rows and three columns of elements. In the formulas (3) and (4), the elements $a_x$, $a_y$, and $a_z$ in A respectively represent the triaxial accelerations of the robot in a positive direction under the body coordinate system; $-a_x$, $-h_y$ and $-a_z$ in A respectively represent the triaxial accelerations of the robot in a negative direction under the body coordinate system. The elements $w_x$, $w_y$ and $w_z$ in G respectively represent the triaxial angular velocities of the robot in the positive direction under the navigation coordinate system; $-w_x$, $-w_y$ and $-w_z$ in G respectively represent the triaxial angular velocities of the robot in the negative direction under the navigation coordinate system.

Then a pose state equation of the robot can be obtained as:

$$
\dot{X} = F(X) * X, \tag{5}
$$

$$
\text{where } F(X) = \begin{bmatrix} O & I & O \\ O & O & O \\ A & O & G \end{bmatrix}. \tag{6}
$$

In the formula (5), $\dot{X}$ denotes a state of the robot; and the state of the robot includes pitch angle pose information and roll angle pose information of the robot; and X is a state variable.

In the formula (6), the letter O represents a zero matrix with three rows and three columns, that is, nine elements in the matrix O with three lows and three columns are all numbers 0; and the letter I represents an identity matrix with three rows and three columns, that is, the upper-left element, the middle element, and the lower-right element of the matrix I are the number 1, while the other six elements are all the number 0.

In a specific embodiment, the step of measuring the localization data of the robot in the predetermined area by using the inertial measurement element of the robot, and calculating the pose of the robot in the predetermined area according to the localization data specifically further includes that:

the pose of the robot is calculated with a state transition matrix and a priori estimation method; and a formula for calculating the pose of the robot with the prior estimation method is:

$$P_{k+1}^{-} = A_{lin,k} P_k A_{lin,k}^{T} + Q_k,$$

where $$P_{k+1}^{-}$$

represents the pose of the robot at the position k+1, the negative sign in the upper-right corner indicates a priori estimation value; $P_k$ represents the pose of the robot at the position k; $A_{lin,k}$ represents the state transition matrix;

$$A_{lin,k}^{T}$$

represents a transpose matrix of the state transition matrix; and $Q_k$ represents a noise.

Specifically, in the method of the present disclosure, the pose state of the robot at next position can be calculated by means of the state transition matrix according to the pose state of the robot at the current position during the operation of the meal delivery robot, so that the calculated pose of the robot at each position is only related to the pose at the previous position, which simplifies the operation compared to the existing solution in the conventional technology in which it is needed to artificially set the virtual wall or artificially measure the slope angle.

In a specific embodiment, after the step of calculating the pose of the robot through the state transition matrix and the priori estimation method, the method further includes the following step:

the priori estimation value of the pose of the robot is connected by a measured value.

Specifically, a relationship between the measurement matrix and the state matrix is:

$$Z_k = ZP_k + R_k, \qquad (7)$$

where $Z_k$ represents the measurement matrix, $P_k$ represents the pose state matrix, $R_k$ represents the noise, and Z is the formula (2). In the above formula, the measurement matrix $Z_k$ and the pose state matrix $P_k$ have a linear relationship. After the priori estimation value of the pose is corrected by using the measured value, a Kalman gain, a posterior state estimation and a variance posterior estimation of the pose data are calculated, and then the pose information of the robot can he obtained. After that, the Euler angle is extracted from the pose angle, including the pitch angle and the roll angle. It should be noted that since the accelerometer and the gyroscope are relatively sensitive, a window sliding filtering is also performed when receiving the data of the accelerometer and the gyroscope, so that the angle information finally obtained by the calculation is more accurate and stable, and the interference of noise is reduced. Meanwhile, the current environment and environmental change of the robot can be obtained from the pose, that is, the Euler angle (Roll and Pitch angles) is obtained by using the pose to obtain the state of the robot, and then the current environment (horizontal or slope road surface) of the robot can be distinguished from the pose; finally, the obtained Euler angle is utilized to compensate for the jump in the angle of view caused by the environment change, thereby avoiding the defects that the robot thinks its own state changes due to the jump in the angle of view caused by up and down the slope or violent bumps, and then affects the localization result, resulting in the localization jump.

In a specific embodiment, the step of determining whether there exists the slope in the predetermined area according to the pose of the robot, and using the pose corresponding to the slope to compensate for the localization error at the slope when these exists the slope includes:

it is determined whether there exists the slope in the predetermined area according to the Euler angle in the pose of the robot, when the pitch angle and roll angle of the Euler angle have values in the body coordinate system, it is determined that there exists the slope in the predetermined area; when the pitch angle and roll angle of the Euler angle are equal to 0 in the body coordinate system, it is determined that there is no slope in the predetermined area;

when it is determined that there exists the slope in the predetermined area, the localization error at the slope is compensated for by using values of the pitch angle and the roll angle of the pose corresponding to the slope.

Specifically, in the method of the present disclosure, the state of the robot is obtained according to the Euler angles of the pose, and then it is determined from the pose that the current environment of the robot is a horizontal surface or an inclined surface such as an upslope or downslope. During the operation of the robot, when the pitch angle of the Euler angle is equal to 0, it means that the robot does not lean forward or backward with respect to the ground. When the roll angle of the Euler angle is equal to 0, it means that the robot does not roll left or right with respect to the ground. Usually, when the robot travels to a position such as an upslope or downslope, the pitch angle of the Euler angle may have a value (positive or negative value) in the body coordinate system. When the robot travels up or down a slope, usually accompanied by the phenomenon of turning left and right. When traveling on an uneven road surface or tripped over something, the robot may roll left and right, and at the moment the roll angle of the Euler angle also has a value (positive or negative value).

Therefore, in the method of the present disclosure, it is determined whether there exists the slope according to the Euler angle corresponding to a certain position where the robot travels; when it is determined that there exists the slope, the value of the Euler angle at the slope position is utilized to compensate for the localization error at the slope.

Compared to the existing solution in the conventional technology, the slope localization correction method for the robot in the present disclosure at least has the following advantages.

(1) Good real-time performance. The inertial components can be utilized to obtain the pose and pose change of the robot in real time, to infer the change in the environment where the robot is located, thereby compensating for the localization results of the robot in real time.

(2) High robustness. Data of the accelerometer and gyroscope is combined to obtain the pose, thereby avoiding the problem that although measured values obtained over a long period of time using the accelerometer alone are more accurate, there exists the error due to the noise in a short period of time, and further avoiding the problem that although measured values obtained over a short period of time using the gyroscope alone are more accurate, the error may he caused by the zero drift of the gyroscope itself in a long period of time. Accordingly, the precise pose of the robot can be stably obtain for a long period of time, and the current environment and environmental change of the robot can be accurately estimated, such that the robot can still obtain stable and reliable localization results even on the slope or violent bumpy environment; and the sensing, planning and scheduling modules can also operate normally according to the precise localization result.

(3) High precision. The localization error caused by the slope or violent bumps, resulting in the localization jumps, is effectively compensated for. It is measured and calculated that when the angle of the slope is 10 degrees, the localization jump of the robot may be about 0.4 m. For the indoor localization scene which requires a high precision, such type of localization error cannot be tolerated. By the present disclosure, the localization error in this type of scene is corrected, thereby avoiding the localization jump, and finally obtaining accurate localization results.

(4) Convenient and quick. Firstly, there is no need to artificially set the virtual wall to limit the operating boundary of the robot, which greatly improves the environmental adaptability of the robot; secondly, there is no need to artificially measure the angle of the slope and set the slope elements in the map. When the robot is located on the slope, the localization is compensated for using the measured angle of the slope. The robot can measure and calculate the environment and environmental changes according to the change in its own pose; and the robot itself may correct its own localization error without human interference.

Referring to FIG. 2, the present disclosure further provides a slope localization correction apparatus, which corresponds to the above-mentioned slope localization correction method and is applied to a robot. The slope localization correction apparatus includes a pose calculation unit 100, a slope determination unit 200, and a localization error compensation unit 300.

The pose calculation unit 100 is configured to measure localization data of the robot in a predetermined area by using an inertial measurement element of the robot, and calculate a pose of the robot in the predetermined area according to the localization data.

The slope determination unit 200 is configured to determine whether there exists a slope in the predetermined area according to the pose of the robot.

The localization error compensation unit 300 is configured to, when there exists the slope in the predetermined area, use a pose corresponding to the slope to compensate for the localization error at the slope.

In the slope localization correction apparatus of the present disclosure, the inertial measurement element is utilized to obtain the pose and pose change of the robot in real time, thereby inferring the change in the environment where the robot is located, and the localization result of the robot can he compensated for in real time. Accordingly the apparatus has good real-time performance. Moreover, the robot can calculate the environment and environmental change according to the change in its own pose, and can correct its own localization error without the human interference. Accordingly, there is no need to artificially set up the virtual wall or artificially measure the angel of the slope, which is convenient and quick.

Referring to FIGS. 1 and 3, the present disclosure further provides a robot, including:

one or more processors 10, a memory 20; and one or more programs stored in the memory 20 and executed by the one or more processors 10, and including instructions for executing the slope localization correction method in any of the above-mentioned embodiments.

The memory 20 is configured to store a computer program executable by the processor 10. When executing the program, the processor 10 implements the slope localization correction method in any of the above-mentioned embodiments.

The memory 20 may include a high-speed RAM memory, and may further include a non-volatile memory, such as at least one magnetic disk memory. Further, the robot may further include a communication interface 30 for communication between the memory 20 and the processor 10.

If the memory 21, the processor 10, and the communication interface 30 are implemented independently, the communication interface 30, the memory 20, and the processor 10 may be connected to each other through a bus to complete the mutual communication. The bus may be an Industry Standard Architecture (ISA) bus, a Peripheral Component Interconnect (PCI) bus, or an Extended Industry Standard Architecture (EISA) bus. The bus can he summarized as an address bus, a data bus, a control bus and so on. For ease of representation, only one thick line is used in FIG. 3, but it does not mean that there is only one bus or one type of bus.

Optionally, in specific embodiment, if the memory 20, the processor 10 and the communication interface 30 are integrated in one chip, the memory 20, the processor 10 and the communication interface 30 can communicate with each other through an internal interface.

The processor 10 may he a Central Processing Unit (CPU), or an Application Specific Integrated Circuit (ASIC), or configured to implement one or more integrated circuits in the embodiments of the present disclosure.

Figure 4:
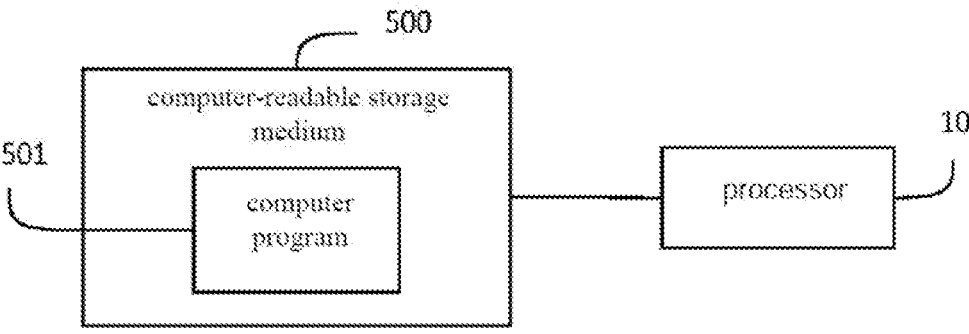
FIG. 4 is a schematic diagram of a connection relationship between a computer-readable storage medium and a processor according to an embodiment of the present disclosure.

Referring to FIG. 4, the present disclosure further provides a non-transitory computer-readable storage medium 500 including a computer program. When the computer program 501 is executed by one or more processors 10, the processors 10 execute the slope localization correction method in any of the above-mentioned embodiments.

In the description of the specification, the description referring to the terms "an embodiment", "some embodiments", "example", "specific example", or "some examples"

mean that specific features, results, materials or characteristics described in conjunction with the embodiments or examples are included in at least one embodiment or example of the present disclosure. In the specification, the schematic expressions of the above terms do not definitely refer to the same embodiment or example. Furthermore, the described specific features, results, materials or characteristics may he combined with any appropriate manners in any one or more embodiments or examples.

Although the embodiments of the present disclosure are shown and described above, it can be appreciated that the above-mentioned embodiments are exemplary and should not be construed as limitations to the present disclosure. Those skilled in the art can perform variations, modifications, substitutions, and modifications to the above-described embodiments within the scope of the present disclosure without departing from the principle and purpose of the present disclosure.

What is claimed is:

1. A slope localization correction method, applied to a robot, comprising:

measuring localization data of the robot in a predetermined area by an inertial measurement element of the robot, and calculating a pose of the robot in the predetermined area according to the localization data;

determining whether there exists a slope in the predetermined area according to the pose of the robot;

compensating for a localization error at the slope by using a pose corresponding to the slope when determining that there exists the slope in the predetermined area, wherein the measuring localization data of the robot in the predetermined area by the inertial measurement element of the robot, and calculating the pose of the robot in the predetermined area according to the localization data further comprises:

measuring a triaxial acceleration and a triaxial angular velocity of the robot by the inertial measurement element; calculating the pose of the robot through a first Euler angle anti-rotation matrix formed by the triaxial acceleration and a second Euler angle anti-rotation matrix formed by the triaxial angular velocity, wherein a pose state equation of the robot is: $\dot{X}=F(X)*X$, wherein, $$F(X) = \begin{bmatrix} O & I & O \\ O & O & O \\ A & O & G \end{bmatrix},$$

O represents a zero matrix with three rows and three columns, I represents an identity matrix with three rows and three columns, A represents the first Euler angle anti-rotation matrix, G represents the second Euler angle anti-rotation matrix, X denotes a state of the robot, the state of the robot comprises pitch angle pose information and roll angle pose information of the robot, X is a state variable, $$A = \begin{bmatrix} 0 & a_z & -a_y \\ -a_z & 0 & a_x \\ a_y & -a_x & 0 \end{bmatrix}, G = \begin{bmatrix} 0 & -w_z & w_y \\ w_z & 0 & -w_x \\ -w_y & w_x & 0 \end{bmatrix},$$

in the first Euler angle anti-rotation matrix, $a_x$, $a_y$, and $a_z$ respectively represent triaxial accelerations of the robot in a positive direction under a body coordinate system, $-a_x$, $-a_y$ and $-a_z$ respectively represent triaxial accelerations of the robot in a negative direction under the body coordinate system; and in the second Euler angle anti-rotation matrix, $w_x$, $w_y$ and $w_z$ respectively represent triaxial angular velocities of the robot in the positive direction under a navigation coordinate system, $-w_x$, $-w_y$ and $-w_z$ respectively represent triaxial angular velocities of the robot in the negative direction under the navigation coordinate system.

2. The slope localization correction method according to claim 1, wherein the measuring localization data of the robot in the predetermined area by the inertial measurement element of the robot, and calculating the pose of the robot in the predetermined area according to the localization data further comprises:

calculating the pose of the robot with a state transition matrix and a priori estimation method, wherein a formula for calculating the pose of the robot with the prior estimation method is:

$$P_{k+1}^- = A_{lin,k} P_k A_{lin,k}^T + Q_k,$$

wherein $$P_{k+1}^-$$

represents a pose of the robot at a position k+1, $P_k$ represents a pose of the robot at a position k, $A_{lin,k}$ represents the state transition matrix, $$A_{lin,k}^T$$

represents a transpose matrix of the state transition matrix, $Q_k$ represents a noise.

3. The slope localization correction method according to claim 2, further comprising:

after calculating the pose of the robot with the state transition matrix and the priori estimation method, correcting a priori estimation value of the pose of the robot by a measured value.

4. The slope localization correction method according to claim 1, wherein the determining whether there exists the slope in the predetermined area according to the pose of the robot, compensating for the localization error at the slope by using a pose corresponding to the slope when determining that there exists the slope in the predetermined area comprises:

determining whether there exists the slope in the predetermined area according to a Euler angle in the pose of the robot; determining that there exists the slope in the predetermined area when a pitch angle and a roll angle of the Euler angle have values in the body coordinate system; determining that there is no slope in the predetermined area when the pitch angle and roll angle of the Euler angle are equal to 0 in the body coordinate system;

when determining that there exists the slope in the predetermined area, compensating for the localization error at the slope by using values of the pitch angle and the roll angle of the pose corresponding to the slope.

5. The slope localization correction method according to claim 1, further comprising:

after measuring the localization data of the robot in the predetermined area by the inertial measurement element of the robot, performing window sliding filtering processing on the localization data measured by the inertial measurement element, wherein the inertial measurement element comprises an angular motion detection device configured to measure an angular velocity and an acceleration detection device configured to measure a linear acceleration.

6. A robot, comprising a processor and a memory for storing a computer program executable by the processor, wherein the processor, when executing the computer program, performs steps of:

measuring localization data of the robot in a predetermined area by an inertial measurement element of the robot, and calculating a pose of the robot in the predetermined area according to the localization data;

determining whether there exists a slope in the predetermined area according to the pose of the robot;

when determining that there exists the slope in the predetermined area, compensating for a localization error at the slope by using a pose corresponding to the slope, wherein the step of measuring localization data of the robot in the predetermined area by the inertial measurement element of the robot, and calculating the pose of the robot in the predetermined area according to the localization data comprises:

measuring a triaxial acceleration and a triaxial angular velocity of the robot by the inertial measurement element; calculating the pose of the robot through a first Euler angle anti-rotation matrix formed by the triaxial acceleration and a second Euler angle anti-rotation matrix formed by the triaxial angular velocity, wherein a pose state equation of the robot is: $\dot{X}=F(X)*X$, wherein, $$F(X) = \begin{bmatrix} O & I & O \\ O & O & O \\ A & O & G \end{bmatrix},$$

O represents a zero matrix with three rows and three columns, I represents an identity matrix with three rows and three columns, A represents the first Euler angle anti-rotation matrix, G represents the second Euler angle anti-rotation matrix, $\dot{X}$ denotes a state of the robot, the state of the robot comprises pitch angle pose information and roll angle pose information of the robot, X is a state variable, $$A = \begin{bmatrix} 0 & a_z & -a_y \\ -a_z & 0 & a_x \\ a_y & -a_x & 0 \end{bmatrix}, G = \begin{bmatrix} 0 & -w_z & w_y \\ w_z & 0 & -w_x \\ -w_y & w_x & 0 \end{bmatrix},$$

in the first Euler angle anti-rotation matrix, $a_x$, $a_y$, and $a_z$ respectively represent triaxial accelerations of the robot in a positive direction under a body coordinate system, $-a_x$, $-a_y$ and $-a_z$ respectively represent triaxial accelerations of the robot in a negative direction under the body coordinate system; and in the second Euler angle anti-rotation matrix, $w_x$, $w_y$ and $w_z$ respectively represent triaxial angular velocities of the robot in the positive direction under a navigation coordinate system, $-w_x$, $-w_y$ and $-w_z$ respectively represent triaxial angular velocities of the robot in the negative direction under the navigation coordinate system.

7. The robot according to claim 6, wherein the step of measuring localization data of the robot in the predetermined area by the inertial measurement element of the robot, and calculating the pose of the robot in the predetermined area according to the localization data further comprises:

calculating the pose of the robot with a state transition matrix and a priori estimation method, wherein a formula for calculating the pose of the robot with the prior estimation method is:

$$P_{k+1}^- = A_{lin,k} P_k A_{lin,k}^T + Q_k,$$

wherein $$P_{k+1}^-$$

represents a pose of the robot at a position k+1, $P_k$ represents a pose of the robot at a position k, $A_{lin,k}$ represents the state transition matrix, $$A_{lin,k}^T$$

represents a transpose matrix of the state transition matrix, $Q_k$ represents a noise;

or, correcting a priori estimation value of the pose of the robot by a measured value after calculating the pose of the robot with the state transition matrix and the priori estimation method.

8. The robot according to claim 6, wherein the step of determining whether there exists the slope in the predetermined area according to the pose of the robot, compensating for the localization error at the slope by using a pose corresponding to the slope when determining that there exists the slope in the predetermined area comprises:

determining whether there exists the slope in the predetermined area according to a Euler angle in the pose of the robot; determining that there exists the slope in the predetermined area when a pitch angle and a roll angle of the Euler angle have values in the body coordinate system; determining that there is no slope in the predetermined area when the pitch angle and roll angle of the Euler angle are equal to 0 in the body coordinate system;

when determining that there exists the slope in the predetermined area, compensating for the localization error at the slope by using values of the pitch angle and the roll angle of the pose corresponding to the slope.

9. The robot according to claim 6, wherein the steps further comprise:

after measuring the localization data of the robot in the predetermined area by the inertial measurement element of the robot, performing window sliding filtering processing on the localization data measured by the inertial measurement element, wherein the inertial measurement element comprises an angular motion detection device configured to measure an angular velocity and an acceleration detection device configured to measure a linear acceleration.

10. One or more non-transitory computer-readable storage media for storing computer-readable instructions, wherein the computer-readable instructions, when executed by one or more processors, cause the one or more processors to perform steps of:

measuring localization data of a robot in a predetermined area by an inertial measurement element of the robot, and calculating a pose of the robot in the predetermined area according to the localization data;

determining whether there exists a slope in the predetermined area according to the pose of the robot;

compensating for a localization error at the slope by using a pose corresponding to the slope when determining that there exists the slope in the predetermined area;

wherein the step of measuring localization data of the robot in the predetermined area by the inertial measurement element of the robot, and calculating the pose of the robot in the predetermined area according to the localization data further comprises:

measuring a triaxial acceleration and a triaxial angular velocity of the robot by the inertial measurement element; calculating the pose of the robot through a first Euler angle anti-rotation matrix formed by the triaxial acceleration and a second Euler angle anti-rotation matrix formed by the triaxial angular velocity:

wherein a pose state equation of the robot is: $\dot{X}=F(X)*X$, wherein, $$F(X) = \begin{bmatrix} O & I & O \\ O & O & O \\ A & O & G \end{bmatrix},$$

O represents a zero matrix with three rows and three columns, I represents an identity matrix with three rows and three columns, A represents the first Euler angle anti-rotation matrix, G represents the second Euler angle anti-rotation matrix, $\dot{X}$ denotes a state of the robot, the state of the robot comprises pitch angle pose information and roll angle pose information of the robot, X is a state variable, $$A = \begin{bmatrix} 0 & a_z & -a_y \\ -a_z & 0 & a_x \\ a_y & -a_x & 0 \end{bmatrix}, G = \begin{bmatrix} 0 & -w_z & w_y \\ w_z & 0 & -w_x \\ -w_y & w_x & 0 \end{bmatrix},$$

in the first Euler angle anti-rotation matrix, $a_x$, $a_y$, and $a_z$ respectively represent triaxial accelerations of the robot in a positive direction under a body coordinate system, $-a_x$, $-a_y$ and $-a_z$ respectively represent triaxial accelerations of the robot in a negative direction under the body coordinate system; and in the second Euler angle anti-rotation matrix, $w_x$, $w_y$ and $w_z$ respectively represent triaxial angular velocities of the robot in the positive direction under a navigation coordinate system, $-w_x$, $-w_y$ and $-w_z$ respectively represent triaxial angular velocities of the robot in the negative direction under the navigation coordinate system.

11. The computer-readable storage media according to claim 10, wherein the step of measuring localization data of the robot in the predetermined area by the inertial measurement element of the robot, and calculating the pose of the robot in the predetermined area according to the localization data further comprises:

calculating the pose of the robot with a state transition matrix and a priori estimation method, wherein a formula for calculating the pose of the robot with the prior estimation method is:

$$P_{k+1}^- = A_{lin,k} P_k A_{lin,k}^T + Q_k,$$

wherein $$P_{k+1}^-$$

represents a pose of the robot at a position k+1, $P_k$ represents a pose of the robot at a position k, $A_{lin,k}$ represents the state transition matrix, $$A_{lin,k}^T$$

represents a transpose matrix of the state transition matrix, $Q_k$ represents a noise;

or, correcting a priori estimation value of the pose of the robot by a measured value after calculating the pose of the robot with the state transition matrix and the priori estimation method.

12. The computer-readable storage media according to claim 10, wherein the step of determining whether there exists the slope in the predetermined area according to the pose of the robot, compensating for the localization error at the slope by using a pose corresponding to the slope when determining that there exists the slope in the predetermined area comprises:

determining whether there exists the slope in the predetermined area according to a Euler angle in the pose of the robot; determining that there exists the slope in the predetermined area when a pitch angle and a roll angle of the Euler angle have values in the body coordinate system; determining that there is no slope in the predetermined area when the pitch angle and roll angle of the Euler angle are equal to 0 in the body coordinate system;

when determining that there exists the slope in the predetermined area, compensating for the localization error at the slope by using values of the pitch angle and the roll angle of the pose corresponding to the slope.

13. The computer-readable storage media according to claim 10, wherein the steps further comprise:

after measuring the localization data of the robot in the predetermined area by the inertial measurement element of the robot, performing window sliding filtering processing on the localization data measured by the inertial measurement element, wherein the inertial measurement element comprises an angular motion detection device configured to measure an angular velocity and an acceleration detection device configured to measure a linear acceleration.

* * * * *